United States Patent
Rideout

(10) Patent No.: US 9,092,580 B2
(45) Date of Patent: *Jul. 28, 2015

(54) METHOD FOR FINDING STARTING BIT OF REFERENCE FRAMES FOR AN ALTERNATING-PARITY REFERENCE CHANNEL

(71) Applicant: Altera Newfoundland Technology Corp., Mt. Pearl (CA)

(72) Inventor: Howard Rideout, St. John's (CA)

(73) Assignee: Altera Newfoundland Technology Corp., Mount Pearl, Newfoundland and Labrador (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/105,798

(22) Filed: Dec. 13, 2013

(65) Prior Publication Data

US 2014/0101350 A1 Apr. 10, 2014

Related U.S. Application Data

(63) Continuation of application No. 12/805,923, filed on Aug. 25, 2010, now Pat. No. 8,631,171.

(51) Int. Cl.
*G06F 13/38* (2006.01)
*G06F 13/40* (2006.01)
*G06F 13/42* (2006.01)

(52) U.S. Cl.
CPC ............ *G06F 13/38* (2013.01); *G06F 13/4013* (2013.01); *G06F 13/4221* (2013.01)

(58) Field of Classification Search
USPC ......................................................... 710/30
See application file for complete search history.

(56) References Cited

U.S. PATENT DOCUMENTS

| 4,346,474 | A | 8/1982 | Sze |
| 6,819,683 | B2 | 11/2004 | Jones et al. |
| 6,999,891 | B2 | 2/2006 | Pepper |
| 7,467,335 | B2 | 12/2008 | Otto et al. |
| 8,631,171 | B2* | 1/2014 | Rideout .......................... 710/30 |
| 2008/0037594 | A1* | 2/2008 | Hornbuckle et al. ......... 370/537 |
| 2010/0086075 | A1 | 4/2010 | Parikh et al. |

OTHER PUBLICATIONS

OIF, Scalable Serdes Framer Interface (SFI-S), Optical Internetworking forum, pp. 1-32, 2008.
Optical Internetworking Forum, "SFI-4 (OC-192 Serdes-Framer Interface) OIF-PLL-02-0—Proposal for a Common Electrical Interface Between SONET Framer and Serializer/Deserializer Parts for OC-192 Interfaces," Sep. 26, 2000, see especially pp. 3-22.
Optical Internetworking Forum, "Serdes Framer Interface Level 5 (SFI-5): Implementation Agreement for 40Gb/s Interface for Physical Layer Devices," Jan. 29, 2002, see especially pp. 8-30.
Optical Internetworking Forum, "Scalable Serdes Framer Interface (SFI-S): Implementation Agreement for Interfaces Beyond 40G for Physical Layer Devices," Nov. 2008, see especially pp. 7-29.

* cited by examiner

*Primary Examiner* — Kris Rhu
(74) *Attorney, Agent, or Firm* — Ropes & Gray LLP

(57) ABSTRACT

The present invention discloses a method for locating the reference frames of the reference lane on the transmitting data bus. The present invention addresses this object by disclosing a method whereby the relationship between the size of the reference frame transmitted over the reference lane and the width of the data bus is such that the reference frame is bit-shifted automatically until it is aligned with the data bus.

19 Claims, 2 Drawing Sheets

METHOD FOR FINDING STARTING BIT OF REFERENCE FRAMES FOR AN ALTERNATING-PARITY REFERENCE CHANNEL

CROSS-REFERENCE TO RELATED APPLICATIONS

This application is a continuation of U.S. Pat. application Ser. No. 12/805,923, filed Aug. 25, 2010, the disclosure of which is hereby incorporated by reference herein in its entirety.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

In computing, a data bus is simply a device which facilitates the transfer of data between data processing elements. In telecommunications applications, data busses can transfer data between separate elements on a board even between specific instantiations of logic on a single chip, like an FPGA or an ASIC. A common data bus in these applications is the interface between serializing/deserializing (SERDES) devices and a data framer. In the interests of interoperability, the interface is typically instantiated in accord with the SERDES Framer Interface (SFI) Implementation agreements published by the Optical Internetworking Forum (OIF). The latest of these agreements, rather than addressing a particular rate of data transfer, is directed towards the needs of future networks which will operate at rates beyond 40 G. The 40 G SFI standard, SFI-5, features four data transmission lanes as well as a fifth lane for the transmission of deskew data for the data frames being transmitted across the bus. Based on this architecture, the latest OIF standard details the implementation of an SFI bus that can incorporate 4-20 data lanes with a single deskew lane, and theorizes the implementation of even larger bus sizes beyond 20 lanes for future applications at speeds which remain in the realm of theory.

This latest scalable bus implementation is known as SFI-S. The OIF's SFI-S implementation is an expansion upon the concepts of the SFI-5 and SFI-4 standards. At its smallest size (4+1 lanes), SFI-S closely resembles SFI-5, although some differences exist in SFI-S's deskew lane. The core concept of the OIF's SFI standards is a single 10 Gb/s data transmission lane with an accompanying deskew lane (SFI-4). Successive iterations of the standard offer increasingly larger numbers of data lanes transmitting multiplexed data frames. As these architectures have become more complex and consequently faster, the issue of skew has become more important: higher data rates mean greater sensitivity to timing errors.

As indicated above, the SFI standards address the issue of skew by including a deskew, or reference, lane in the design of the data bus. The deskew lane transmits a reference frame which allows deskew elements in the SERDES or framer to measure skew in the incoming data, and adjust the transmission of the data accordingly. The transmitted reference lane consists of a number of five-bit elements which are themselves comprised of four samples taken from the data lanes followed by a parity of those four bits. The parity bits may be even or odd, dependent upon their position in the reference frame. The SFI-S implementation agreement states that every reference frame must begin with an even parity element and end with an odd parity element. Any additional elements required alternate even and odd panty, but always begin with an even parity element. Thus, a four-element frame is defined as even, even, odd, odd. The number of required elements is dependent upon the number of data lanes; the maximum number of data lanes supported by a reference lane is n×4, where n is the number of elements, bearing in mind that there must be at least 2 elements per frame. Thus, 4-8 data lanes require a 2-element reference frame, 9-12 lanes require a 3-element reference frame, 13-16 lanes require a 4-element reference frame, and 17-20 lanes require a 5-element reference frame. As noted above, each of these elements are composed of four bit samples from the data lanes. The sampling method is defined in the implementation agreement:

The bit samples of the reference frame shall be filled, starting at the highest number data lane RX/TXDATA (n−1), which is filed into the first sample position of the even parity element at the beginning of the frame. RX/TXDATA(n−2) is filled into the second sample position and so on, until RX/TXDATA(0) is filled in. If the RX/TXDATA(0) sample does not land in the last sample position of the frame ending odd element, the remaining bit samples are filled again, starting from RX/TXDATA (n−1). (SFI-S)

This sampling method, for a ten-lane configuration, is illustrated in FIG. 1. The deskew operation is dependent upon the proper construction of reference frames; it is therefore essential that the reference frames begin with the correct bits, so that the lanes of the data bus may be correctly deskewed. It is possible, however, that sampling may begin with the incorrect bit, due to a timing error or skew. If such an event occurs, it is necessary to spend additional on-board resources to hunt for the correct starting bit of the reference frames. A common means of rectifying this issue is to employ a bit-shifting element to alter the starting position of bit sampling for the reference lane. Employing such a bit-shifting element requires the use of additional resources, even if an already-present shifting element must be reconfigured to alter the position of the sampled bits. Thus it is necessary to employ a method which can address the issue of a misaligned reference lane without further requiring the use of additional on-board resources.

BRIEF SUMMARY OF THE INVENTION

It is an object of the present invention to provide a method for locating the reference frames of the reference lane on the transmitting data bus. The present invention addresses this object by disclosing a method whereby the relationship between the size of the reference frame transmitted over the reference lane and the width of the data bus is such that the reference frame is bit-shifted automatically until it is aligned with the data bus.

DETAILED DESCRIPTION OF AN EMBODIMENT OF THE INVENTION

The present invention discloses a method for finding the starting bit of the reference frames of the reference lane on a data bus. The invention comprises transmitting a reference frame over the reference lane, wherein the reference frame is comprised of a plurality of five-bit elements, wherein each of those five-bit elements is comprised of four bit samples from the data lanes of the data bus, followed by the parity of those four bits; as the reference frame is being transmitted, if the relationship between width of the reference frame and the width of the data bus is such that the reference frame cannot fit evenly within the confines of the data bus, then the difference in bits between the width of the reference frame and the width of the data bus allows the starting bit of the reference frames to cycle through each possible bit position until the correct starting bit is found, without employing an external bit-shifting element.

Figure 1:
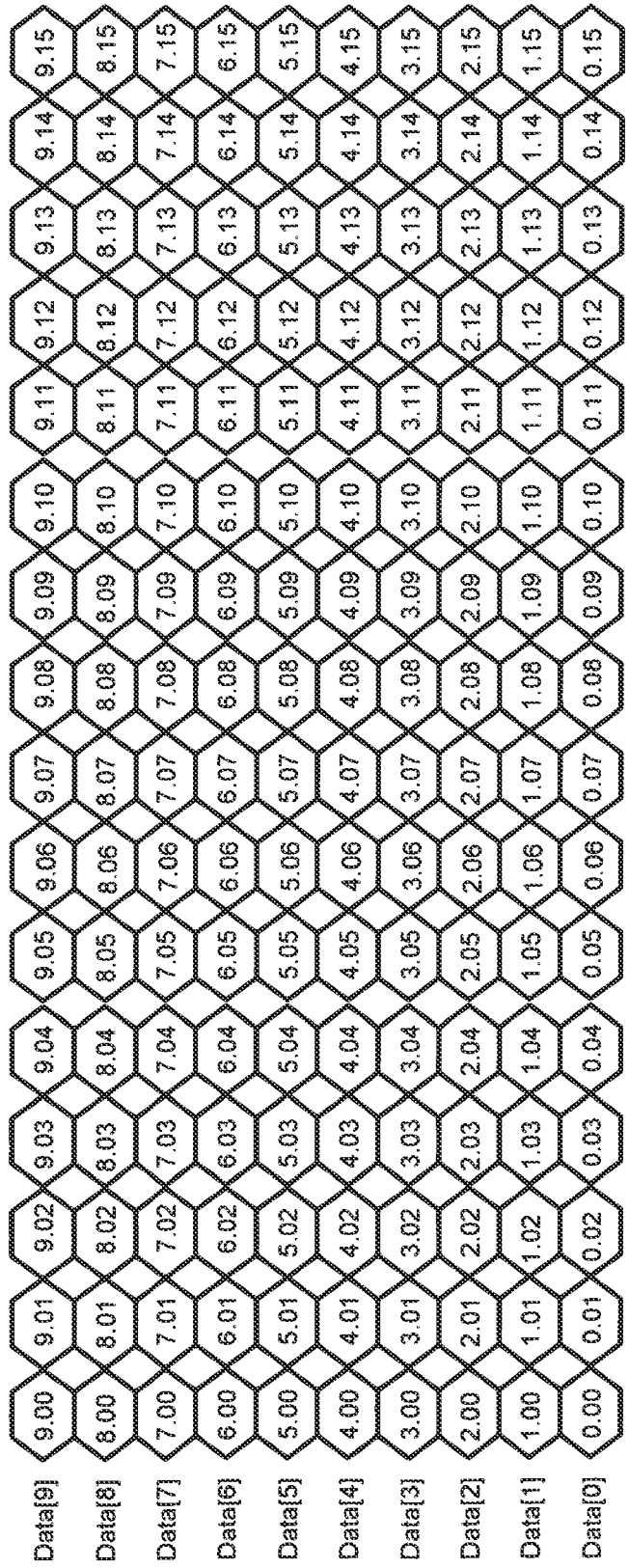
FIG. 1 is an illustration of the composition of an SFI-S reference frame for a ten-lane data bus.
Figure 1:
Figure 2:
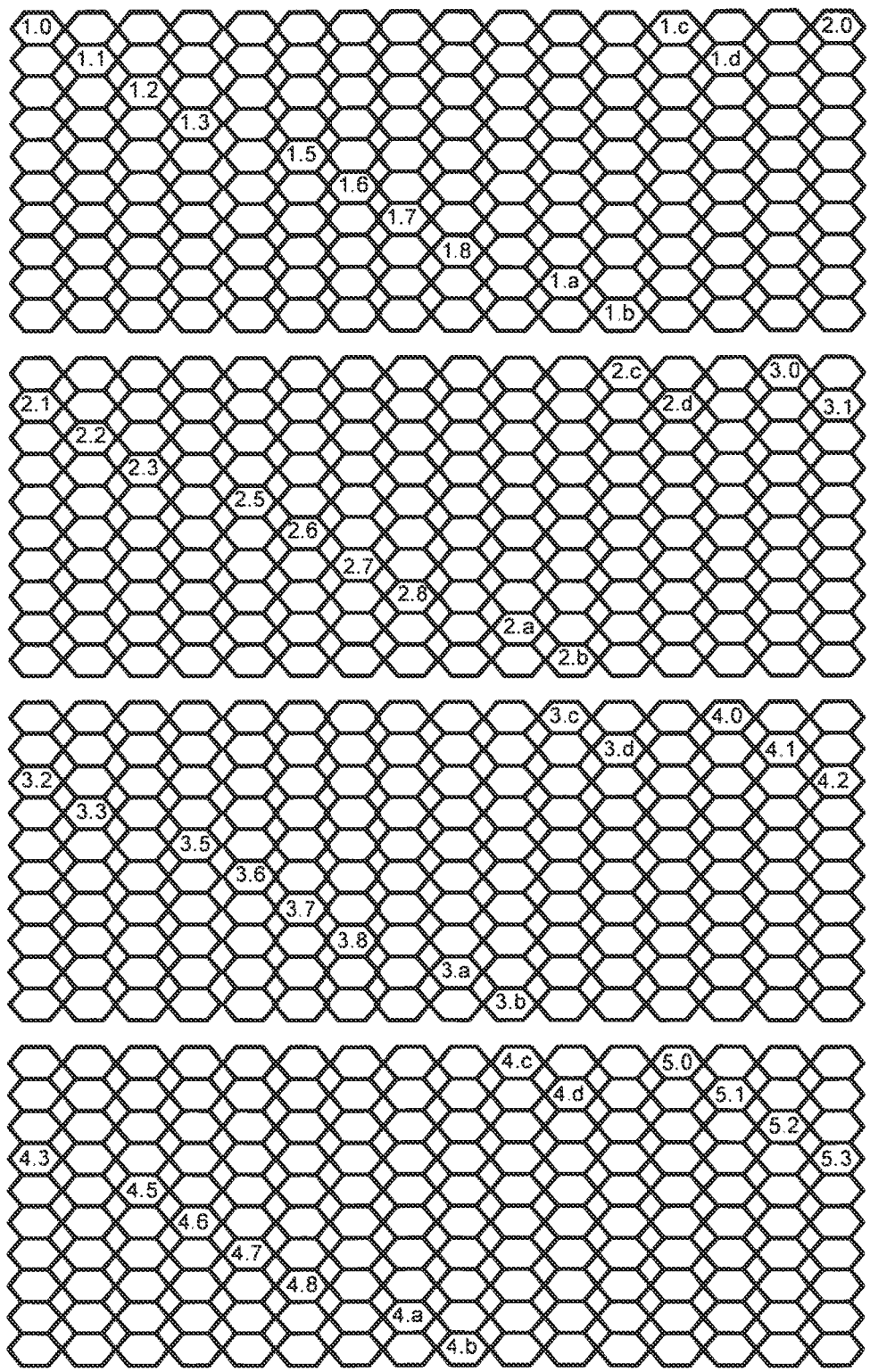
FIG. 2 is an illustration of an embodiment of the present invention, wherein data is transmitted over a ten lane, 64-bit wide bus.

FIG. 2 is an illustration of an embodiment of the present invention, featuring an exploded view of a 64-bit data bus over which ten lanes of data are being transmitted. In accord with the SFI-S Implementation Agreement, a ten-lane embodiment requires a three-element reference frame, wherein each element is five bits wide, and thus creating a fifteen-bit reference frame. The marked bits in each data lane correspond to a sampled bit in the reference frame (not shown). Thus, bits 1.0-3 represent the first four bits of the first element of the first reference frame, bits 2.5-8 represent the second four bits of the second element of the second reference frame, bits 5.0-3 represent the first four bits of the first element of the fifth reference frame, and so on. The sixteen marked bits at the bottom of the figure represent bit "positions" 01-16 within the data bus, imposed upon the bus in the figure for the sake of clarity in offering a detailed description of this particular embodiment of the invention. In a like manner, the data bus has been evenly divided in the figure into four 16-bit wide segments for the sake of clarity. It should be noted that this illustrative embodiment is provided for exemplary purposes only and is not intended to limit the scope of the invention.

As noted above, the ten lane configuration requires a fifteen-bit reference frame transmitted over the reference channel. The reference channel takes samples from the data being transmitted over the 64-bit data bus. The relationship in size between the reference frame and the data bus is most easily represented as a quotient between the two; thus, when the 64 bit bus is divided by the 15-bit reference frame, we find that the result shows four whole reference frames for every 64 bits, with a remainder of four bits left over. So, in this embodiment, for every single reference frame transmitted there is a single leftover bit.

This single bit differential between the reference frames and the width of the data bus ensures that, if not locked, the reference frame shifts its position in relation to the data bus with every reference frame, without the use of an external element. This shift in position is also illustrated in FIG. 2.

In FIG. 2, the first bit of the first reference frame (1.0) is sampled in position 01 in relation to the data bus. Because of the single bit differential noted above, however, the first bit of the second reference frame (2.0), has shifted its position to 16. With each successive reference frame, the position of that frame's first bit shifts by one. Thus, the third frame begins at position 15, the fourth at position 14, and the fifth at position 13. We can infer that the reference frame will continue to shift into a different position until it starts at 01 again, 16 clock cycles after startup; at least one of these positions will be aligned with the data bus, and so a maximum of 16 clock cycles are required to find the correct starting bit for the reference frames on the reference lane within the transmitted data, so that deskew can occur on the receive side. Once the starting bit is found, the reference channel bit position is locked so that the position of the reference frame no longer shifts; in this way, the bits of the reference frames are sampled correctly by taking advantage of the bit differential between the size of a reference frame and the width of the bus, without the use of an external bit-shifting element.

What is claimed is:

1. A method of receiving data over a data bus, the method comprising:
    identifying a fixed position of a plurality of fixed positions in relation to the data bus within each consecutive m bits received on a reference channel, wherein the identified fixed position is aligned with the data bus;
    determining whether a starting symbol of a reference frame of a plurality of reference frames received on the reference channel is located at the identified fixed position, wherein the starting symbol of each reference frame of the plurality of reference frames shifts in position in relation to the data bus;
    in response to determining that the starting symbol of the reference frame is located at the identified fixed position, locking the position of the reference frame; and
    in response to determining that the starting symbol of the reference frame is not located at the identified fixed position, shifting the position of the reference frame by a symbol differential, wherein the symbol differential is based on a relationship between a size of the reference frame and a width of the data bus.

2. The method of claim 1, further comprising:
    in response to determining that the starting symbol of the reference frame is located at the identified fixed position, locking a position of a subsequent reference frame of the plurality of reference frames.

3. The method of claim 1, wherein each reference frame shifts in relation to the data bus by a number of symbols that is different from a number of symbols that a preceding reference frame is shifted in relation to the data bus.

4. The method of claim 1, wherein a width of the data bus is greater than a width of the each reference frame.

5. The method of claim 1, wherein:
    a width of the each reference frame is m symbols; and
    the starting symbol of the each reference frame shifts through a maximum of m+1 positions in relation to the data bus.

6. The method of claim 1, wherein the locking of the position of the reference frame occurs after receiving a maximum of m+1 of the plurality of reference frames.

7. The method of claim 1, wherein the plurality of reference frames is received over an alternating-parity reference channel.

8. The method of claim 1, wherein said data bus is comprised of a plurality of data transmission channels.

9. The method of claim 8, wherein each reference frame has a plurality of elements, each element having multiple bits.

10. The method of claim 9, wherein each element has a plurality of bit samples from said data transmission channels followed by a parity corresponding to the plurality of bit samples.

11. An integrated circuit for receiving data over a data bus, the circuit comprising circuitry for:
    identifying a fixed position of a plurality of fixed positions in relation to the data bus within each consecutive m bits received on a reference channel, wherein the identified fixed position is aligned with the data bus;

determining whether a starting symbol of a reference frame of a plurality of reference frames received on the reference channel is located at the identified fixed position, wherein the starting symbol of each reference frame of the plurality of reference frames shifts in position in relation to the data bus;

in response to determining that the starting symbol of the reference frame is located at the identified fixed position, locking the position of the reference frame; and in response to determining that the starting symbol of the reference frame is not located at the identified fixed position, shifting the position of the reference frame by a symbol differential, wherein the symbol differential is based on a relationship between a size of the reference frame and a width of the data bus.

12. The integrated circuit of claim 11, further comprising:
in response to determining that the starting symbol of the reference frame is located at the identified fixed position, locking a position of a subsequent reference frame of the plurality of reference frames.

13. The integrated circuit of claim 11, wherein each reference frame shifts in relation to the data bus by a number of symbols that is different from a number of symbols that a preceding reference frame is shifted in relation to the data bus.

14. The integrated circuit of claim 11, wherein a width of the data bus is greater than a width of the each reference frame.

15. The integrated circuit of claim 11, wherein:
a width of the each reference frame is m symbols; and
the starting symbol of the each reference frame shifts through a maximum of m+1 positions in relation to the data bus.

16. The integrated circuit of claim 11, wherein the locking of the position of the reference frame occurs after receiving a maximum of m+1 of the plurality of reference frames.

17. The integrated circuit of claim 11, wherein the plurality of reference frames is received over an alternating-parity reference channel.

18. A method for configuring a programmable integrated circuit for receiving data over a data bus, the method comprising:

configuring logic of said programmable integrated circuit for identifying a fixed position of a plurality of fixed positions in relation to the data bus within each consecutive m bits received on a reference channel, wherein the identified fixed position is aligned with the data bus;

configuring logic of said programmable integrated circuit for determining whether a starting symbol of a reference frame of a plurality of reference frames received on the reference channel is located at the identified fixed position, wherein the starting symbol of each reference frame of the plurality of reference frames shifts in position in relation to the data bus;

configuring logic of said programmable integrated circuit for locking the position of the reference frame in response to determining that the starting symbol of the reference frame is located at the identified fixed position; and configuring logic of said programmable integrated circuit for shifting the position of the reference frame by a symbol differential in response to determining that the starting symbol of the reference frame is not located at the identified fixed position, wherein the symbol differential is based on a relationship between a size of the reference frame and a width of the data bus.

19. The method of claim 18, further comprising:
configuring logic of said programmable integrated circuit for locking a position of a subsequent reference frame of the plurality of reference frames in response to determining that the starting symbol of the reference frame is located at the identified fixed position.

\* \* \* \* \*